United States Patent [19]

Ramsay et al.

[11] 4,335,333
[45] Jun. 15, 1982

[54] RASTER SCAN COLOR DISPLAY SYSTEM AND METHOD HAVING IMPROVED PIN CUSHION NON-LINEARITY CORRECTION

[75] Inventors: Michael Ramsay, San Jose, Calif.; Warren Pratt, Loveland, Colo.

[73] Assignee: Hewlett-Packard Company, Palo Alto, Calif.

[21] Appl. No.: 116,421

[22] Filed: Jan. 29, 1980

[51] Int. Cl.³ .............................................. H01J 29/70
[52] U.S. Cl. ...................................... 315/371; 315/393
[58] Field of Search ................................ 315/371, 393

[56] References Cited

U.S. PATENT DOCUMENTS

| | | | |
|---|---|---|---|
| 2,623,196 | 12/1952 | Toulon | 315/393 X |
| 2,649,555 | 8/1953 | Lockhart | 315/371 |
| 3,175,121 | 3/1965 | Birnbaum et al. | 315/393 X |
| 3,422,306 | 1/1969 | Gray | 315/371 |
| 3,995,196 | 11/1976 | Lehnert | 315/371 X |
| 4,041,354 | 8/1977 | Haferl | 315/371 |
| 4,101,814 | 7/1978 | Haferl | 315/371 |
| 4,184,104 | 1/1980 | Shouse, Jr. | 315/371 |
| 4,198,591 | 4/1980 | Ohmori | 315/371 |

Primary Examiner—Malcolm F. Hubler
Attorney, Agent, or Firm—Edward L. Miller; Theodore S. Park

[57] ABSTRACT

A raster scan color display system for a CRT includes a vertical sweep system wherein a parabolic signal repeating at the horizontal sweep rate is multiplied with a vertical sweep signal corresponding to a linear ramp repeating at a vertical deflection rate. The output is differentiated and capacitively coupled to a wideband voltage drive vertical deflection amplifier to provide pin-cushion non-linearity correction.

11 Claims, 11 Drawing Figures

RASTER SCAN COLOR DISPLAY SYSTEM AND METHOD HAVING IMPROVED PIN CUSHION NON-LINEARITY CORRECTION

BACKGROUND OF THE INVENTION

Non-linearities which occur in raster scan CRT displays include on-axis or velocity non-linearity, and pin cushion non-linearity. The effects of these non-linearities are illustrated in FIG. 1 and are due primarily to the difference in location of the center of beam deflection and the center of curvature of the CRT face. Pin cushion non-linearity results in a bowing of horizontal and vertical raster dimensions and velocity non-linearity results in variation in raster line separation.

In monochrome CRT displays, velocity non-linearity is generally corrected for by electrically altering the shape of the sweep current to slow sweep velocity at raster edges and pin cushion effects are corrected for by suitable positioning of permanent magnets on the CRT neck. Using this technique, linearities of approximately ±0.5% are typically obtained where linearity is defined as $$\frac{\Delta d}{L} \times 100\%,$$

L being line length and Δd being peak deviation from a straight line drawn between end points.

In color CRT displays having multiple beams, however, permanent magnets cannot be used for error correction since the magnetic field affects each beam differently causing color misconvergence. As a result, pin cushion correction for such color CRT displays is generally done electrically. Side-to-side non-linearities are corrected for by altering horizontal sweep width as function of vertical position. Top to bottom non-linearities are corrected for by altering sweep height as a function of horizontal position. The latter is by far the most difficult task since it essentially involves superimposing a high frequency, horizontal sweep rate, waveform onto a low frequency, frame rate, waveform and then driving a vertical yoke's inductive load. Techniques used in the television industry have generally involved driving the vertical yoke from a resonant circuit tuned to the horizontal sweep rate. The drive waveform is applied through a saturating transformer giving the effect of varying the drive amplitude as a function of sweep height. Such techniques do not offer linearities of much bettern than ±2% and are typically difficult to align and maintain stable.

The invention provides a novel solution to top-bottom pin cushion problems and a vertical deflection system which is inherently more stable, provides vertical centering and protection against loss of vertical drive, and produces a linearity for color systems comparable to the linearity of monochrome systems.

SUMMARY OF THE INVENTION

A pin cushion non-linearity correction system and method for a raster scan display wherein a parabolic signal having a repetition rate at the horizontal deflection rate is multiplied by a linear ramp signal having a repetition rate at the vertical deflection rate; the product is then differentiated to produce a vertical deflection pin cushion correction signal.

DESCRIPTION OF THE PREFERRED EMBODIMENT

Figure 1:
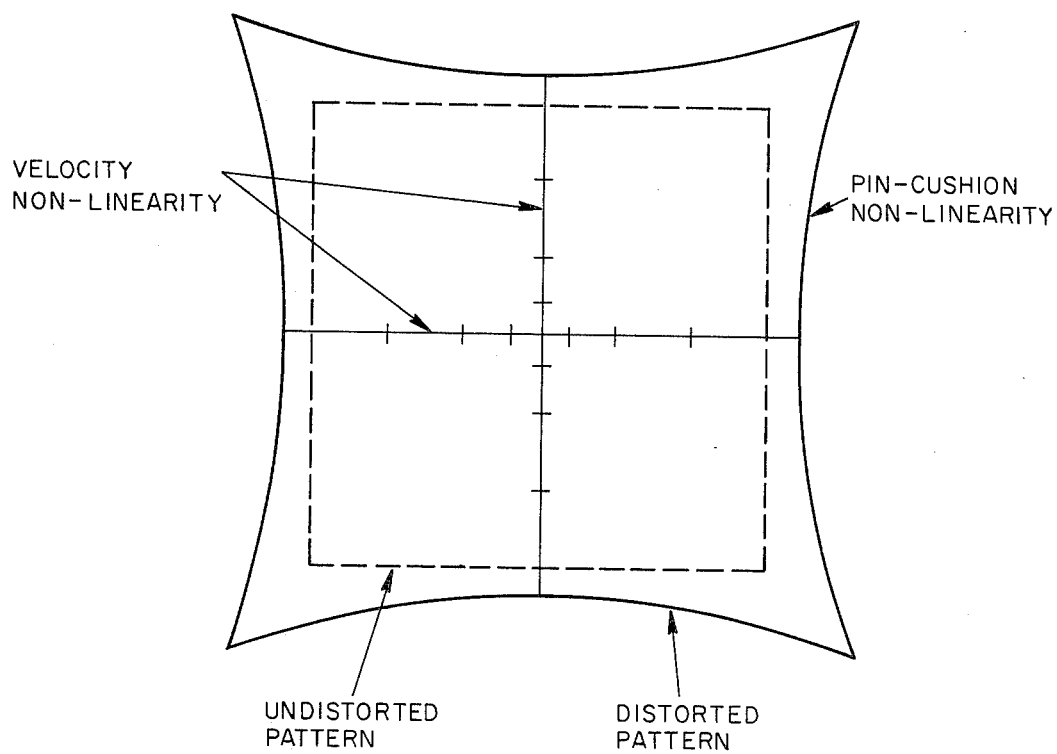
FIG. 1 is a drawing illustrating velocity non-linearity distortion and pin-cushion non-linearity distortion.
Figure 2:
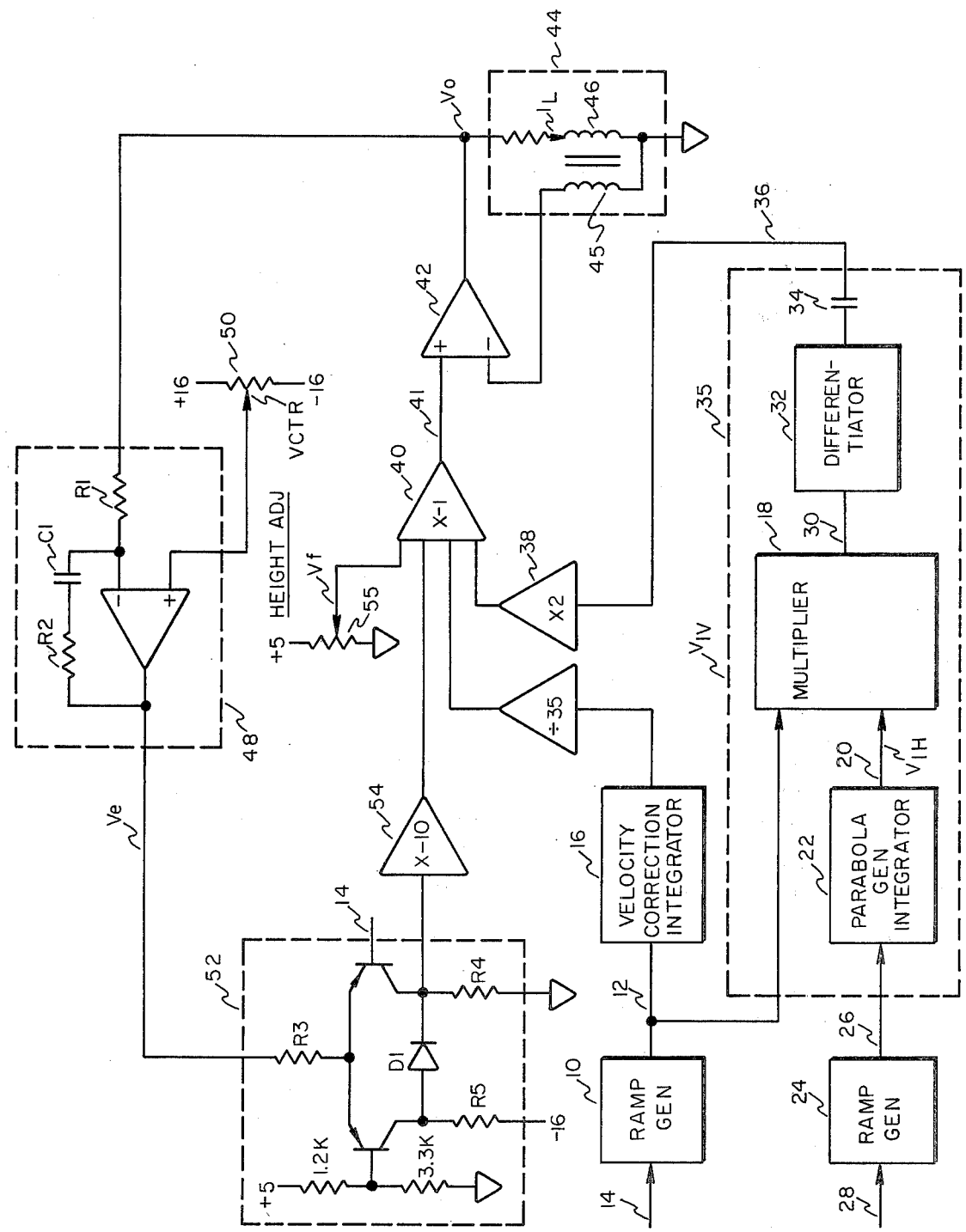
FIG. 2 is a block diagram of a preferred embodiment of a vertical deflection system made in accordance with the invention.

Referring to FIG. 2, a block diagram of a vertical deflection system for a raster scan CRT display, made in accordance with the invention is shown. A top-to-bottom or vertical pin-cushion corrected vertical deflection is achieved by the superposition of a vertical rate sweep waveform and a horizontal rate correction waveform.

Figure 4:
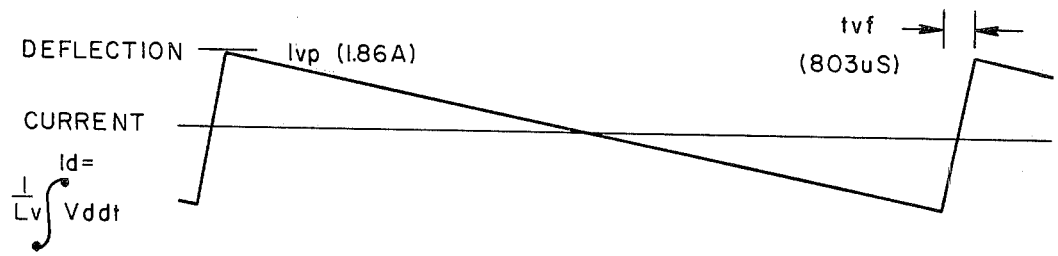
FIG. 4 is a drawing showing an unscaled representation of a vertical deflection current.
Figure 6:
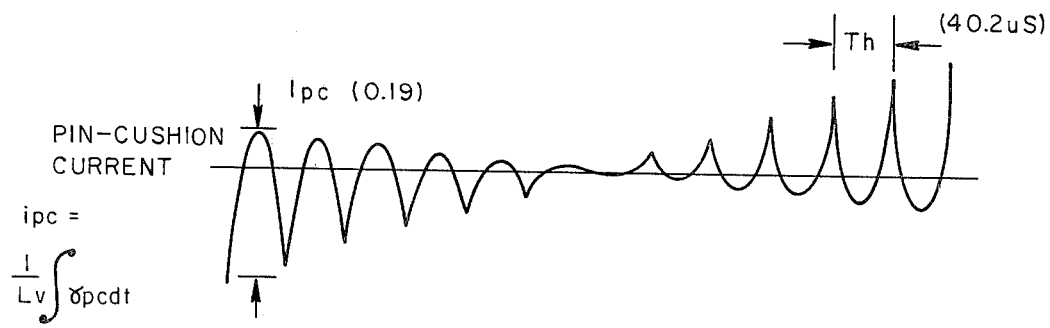
FIG. 6 is a drawing showing an unscaled representation of an equivalent pin-cushion correction current.

Referring to FIG. 4, a typical uncorrected vertical deflection waveform consists of a linear sawtooth, Id repeating at a vertical frame rate. Referring to FIG. 6, a correction waveform is approximated by a series of parabolas repeating at horizontal rate. The amplitude of a particular parabola is a function of its vertical position on the CRT. The amplitude is zero at the center where no correction is needed and a maximum at the top and bottom. The sense of the correction is reversed from top to bottom resulting in the waveform ipc illustrated in FIG. 6.

Figure 7:
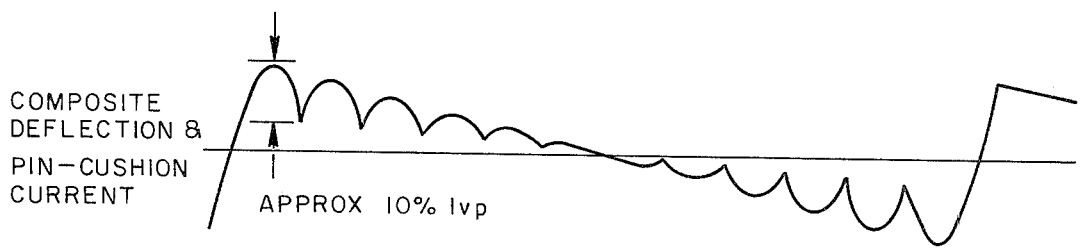
FIG. 7 is a drawing showing an unscaled representation of a pin-cushion corrected vertical deflection current.

Referring to FIG. 7, the sum of waveforms shown in FIGS. 4 and 6 is illustrated and represents current $i_L$ flowing through a vertical deflection yoke 44 shown in FIG. 2.

Typically, the correction current amplitude is about 10% of the deflection current as illustrated in FIG. 7.

Figure 3:
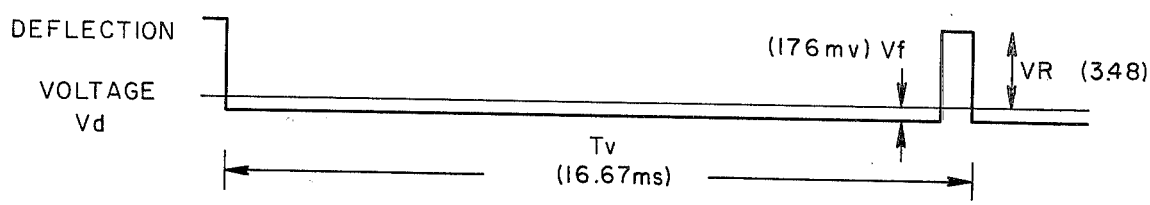
FIG. 3 is a drawing showing an unscaled representation of a vertical deflection voltage.
Figure 5:
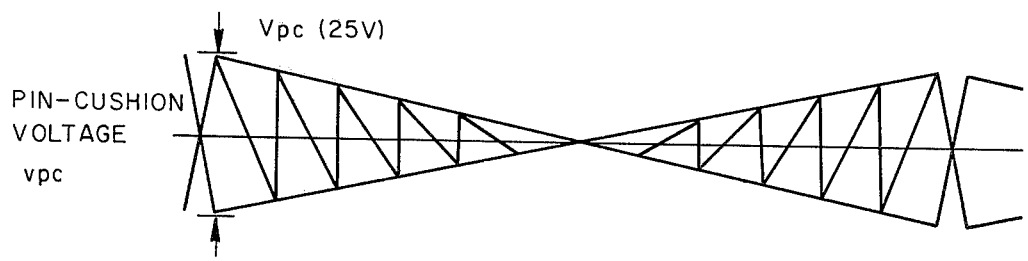
FIG. 5 is a drawing showing an unscaled representation of an equivalent pin-cushion correction voltage.

Referring to FIGS. 3 and 5, associated deflection voltages for deflection and correction are respectively illustrated. The vertical deflection yoke 44 is essentially inductive and each waveform is a derivative of its corresponding current waveform. The values shown are typical for a yoke inductance of approximately 700 μH and a vertical repetition rate of 60 Hz.

Referring to FIG. 5, it can be seen that an alternate method of generating this waveform is to multiply together a vertical rate and horizontal rate sawtooth waveform. In practice, this is achieved by multiplying together a vertical rate sawtooth and a horizontal rate parabola, then differentiating the result (including any multiplier feedthrough terms).

i.e. $V_{pc} = \frac{d}{dt}(V_{RMP} \cdot HCP + \alpha \cdot V_{RMP})$ $= V_{RMP} \frac{d}{dt}(HCP) + HCP \cdot$ $\frac{d}{dt}(V_{RMP}) + \alpha \frac{d}{dt}(V_{RMP})$ $V_{RMP}$ = vertical rate sawtooth $HCP$ = horizontal rate parabola now $\frac{d}{dt}(HCP)$ is a sawtooth at the horizontal rate $V_{pc}$ = pin-cushion correction voltage $\alpha$ = vertical feedthrough factor and $\frac{d}{dt}(V_{RMP})$ is a constant $K_1$ during the scanning portion of the vertical cycle $\therefore V_{pc} = V_{RMP} \frac{d}{dt}(HCP) + HCP \cdot K_1 + \alpha K_1 \simeq V_{RMP} \frac{d}{dt}(HCP)$ A suitable choice of $K_1$ leads to the latter two terms being insignificant. Further, because differentiation is performed after multiplication, any vertical rate feedthrough is reduced to terms ($\alpha K_1$) which are constant during the scanning portion of the vertical cycle.

Referring again to FIG. 2, a ramp generator 10 produces a linear ramp 12 at the display frame rate, called the vertical rate hereafter, in response to a vertical synchronization signal 14. The ramp waveform 12 is applied to a velocity correction integrator 16 and a linear multiplier 18. The linear multiplier 18 multiplies the vertical deflection waveform 12 with a horizontal rate parabolic correction waveform 20 produced by a parabola generator integrator 22. The parabola generator integrator 22 is an integrator driven by a ramp generator 24 which produces a symmetrical ramp waveform 26 at a horizontal deflection rate in response to a horizontal synchronization signal 28.

The output 30 of the linear multiplier 18 is a multiplication of the vertical ramp waveform 12 and the horizontal rate parabolic correction waveform 20. Output 30 is then applied to and differentiated by a differentiator 32. Vertical rate components at the output of differentiator 32 are attenuated by a capacitor 34 thereby preventing sweep non-linearity due to carrier feedthrough. The output from the capacitor 34 is a pin-cushion correction voltage 36. Referring to FIG. 5, an unscaled representation of output 36 is illustrated. The parabola generator 22, the multiplier 18, the differentiator 32 and the capacitor 34 comprise a pin-cushion voltage generator 35.

Referring again to FIG. 2, the pin-cushion correction voltage 36 is amplified by an amplifier 38 and coupled by a mixing amplifier 40 to a deflection amplifier 42.

A major difference between the deflection techniques used in this system and previous techniques is that this deflection system is broadband. This is dictated by the need to apply waveforms at both the horizontal and vertical frequencies. Conventional current amplifier techniques are inherently narrow band (cut off at a few hundred hertz) and a new approach is needed. The deflection technique used is illustrated in FIG. 2. This is a voltage drive approach and relies on a vertical yoke 44 being wound with a sense winding 45 having a 1:1 turns ratio with the main winding 46. The voltage across the sense winding 45 is equal to the voltage across the inductive portion of the main winding 46. This is compared with the input voltage and the amplifier 42 compensates for the resistive effects resulting in:

$$i_L \sim \frac{1}{L_v} \int V_{in} dt,$$

$i_L$ being current through main winding 46, $L_v$ being inductance of main winding, and $V_{in}$ being the input voltage 41 to the amplifier 42. In other words, this is a voltage drive deflection system.

A deflection system having the voltage drive approach is described for example in U.S. Pat. No. 3,434,002 "Horizontal Deflection Circuit With Monitor Winding Inductively Coupled To Yoke" issued to Bernard M. Oliver, and said U.S. patent is hereby fully incorporated by reference. The bandwidth of the deflection system is equal to the unity gain bandwidth of the deflection amplifier 42 and is generally 1 MHz or greater. The drive voltage for forward scan $V_f$ is supplied from the height control 55. During vertical retrace, sampler 52 is switched by the vertical synchronization signal 14 to supply the voltage, from amplifier 48, to balance $V_f$ and cause the vertical deflection current to exactly reverse.

One problem which must be overcome using this technique is to ensure that there is an average voltage of zero volts across the yoke 44. Otherwise large currents would flow through the yoke resulting in bad centering. This is achieved by sensing the output of the deflection amplifier, Vo and using this in a feedback system to maintain Vo average = 0. A block diagram of the feedback system is shown in FIG. 2 and comprises amplifier 48, vertical center adjustment resistor 50, input switch 52, amplifier 54 and the mixing amplifier 40.

The action of the velocity correction integrator 16 and the pin-cushion correction 35 have no effect on the stability of this loop and will be ignored in the following analysis. The compensation amplifier 48 compares the output voltage, Vo with the centering voltage, Vctr. The amplifier 48 output is applied to the input switch 52 which acts as a sampler, allowing compensation current to pass through R4 during vertical retrace time only. In this way, compensation is done only during retrace thus maintaining the integrity of the scan-time linearity.

The action of the vertical centering control Vctr is to allow a DC current to pass through the yoke 46 of an amount, $Idc = Vctr/R_v$ where $R_v$ is the resistance of the yoke 46.

The complete system is second order with:

$$\omega_n = \left(\frac{G_f}{T_v(T_1 + G_f T_2)}\right)^{\frac{1}{2}} \sim \left(\frac{G_f}{T_v T_1}\right)^{\frac{1}{2}}$$

$$2\zeta\omega_n = \frac{G_f(T_v + T_2)}{T_v(T_1 + G_f T_2)} \sim \frac{G_f T_2}{T_v T_1}$$

where:
$\omega_n$ = natural frequency (rads/sec)
$\zeta$ = damping ratio
$G_f$ = forward gain $$= \frac{R_4}{R_3} \cdot \frac{t_r}{t_s + t_r} \cdot G_1$$

$t_r$ = retrace time $t_s$ = scan time
$G_1$ = mixing amp gain
$T_v$ = yoke time constant
  = $L_v/R_v$
$T_1 = R_1 C_1$
$T_2 = R_2 C_1$ The above system analysis assumes that $\omega_n <$ < sampling rate (60 Hz) thus for a change in $V_E = \Delta V_E$, the equivalent change in $V_f$ is $$\Delta V_f = \Delta V_E \cdot \frac{R_4}{R_3} \cdot \frac{t_r}{t_s + t_r}$$

Typical boundary conditions are:

| | | |
|---|---|---|
| 1. | $T_v = 380 \times 10^{-6}$ | Determined by yoke parameters |
| 2. | $T_1/T_2 = 10$ | This should sufficiently attenuate the pin-cushion voltage on $V_E$ |
| 3. | $\dfrac{t_r}{t_s} = 50.6 \times 10^{-3}$ | Frame rate = 60 Hz  $t_r = 803.2$ μs. |

Choose $\omega_n = 50$
$\zeta = 1$.
this yields:
$C_1 = 10\mu F$ (chosen)
$R_2 = 3.9K$
$R_1 = 39K$
$R_4 = 1.33K$
$R_3 = 1.8K$
$G_1 = 10$ In the event of failure of the vertical input drive voltage 14, the compensation amp 48 will automatically ensure that the current in the yoke 44 goes to zero (or the centering current). This is achieved by passing current, either through $R_4$ (failure to zero) or $R_5$ and $D_1$ (failure to one).

Figure 8:
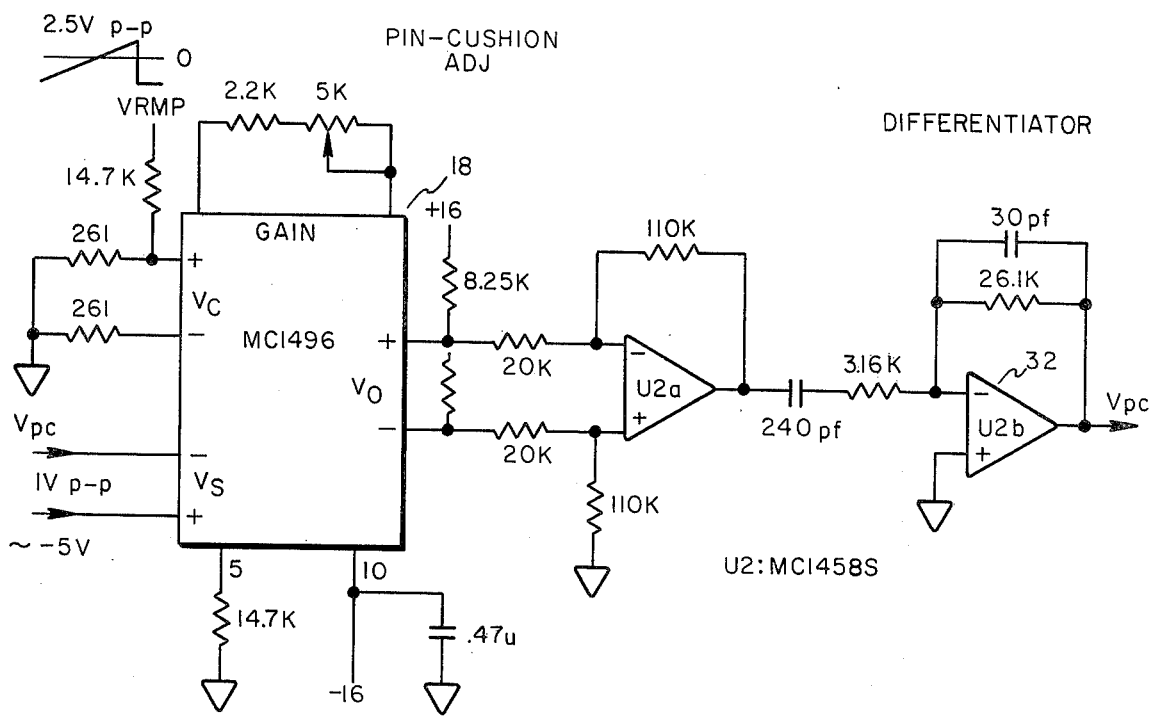
FIG. 8 is a schematic diagram of a pin-cushion voltage generator.

Referring to FIG. 8, a detailed schematic diagram of the pin-cushion voltage generator 35 is shown.

Figure 9:
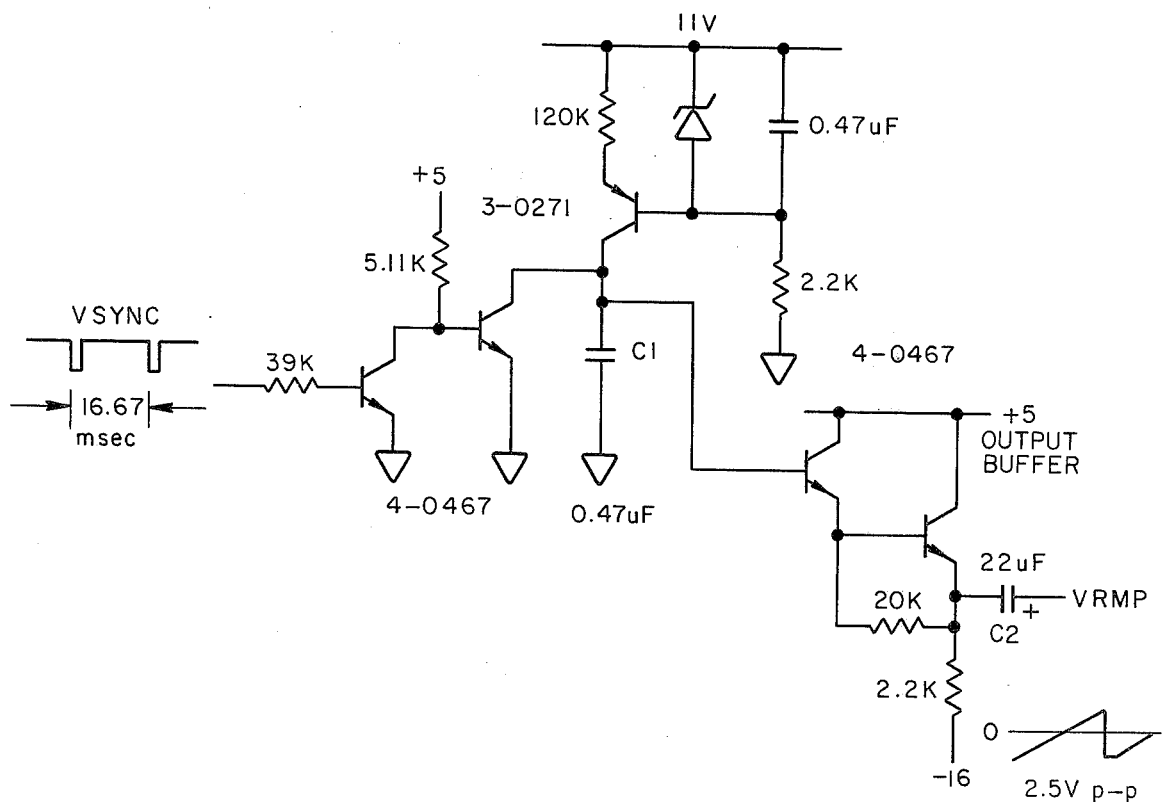
FIG. 9 is a schematic diagram of a ramp generator.

Referring to FIG. 9, a detailed schematic diagram of the ramp generator 10 is shown.

Figure 10:
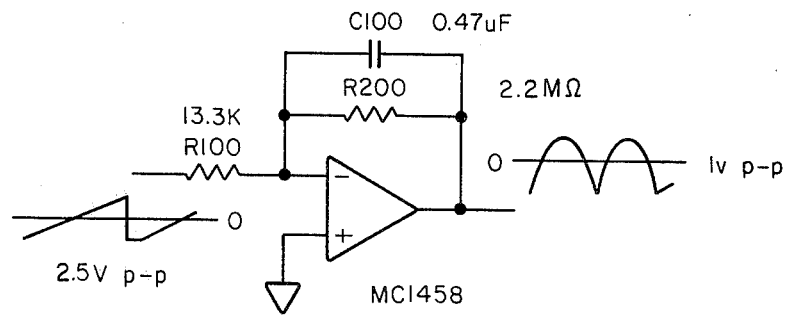
FIG. 10 is a schematic diagram of an integrator.

Referring to FIG. 10, a detailed schematic diagram of the velocity correction integrator 16 is shown. This integrator generates a low-amplitude vertical rate parabola which is added to the main deflection voltage in the mixing amplifier 40. This parabolic injection causes the sweep current slope to be reduced at the extremities of the scan thus compensating for vertical velocity distortion effects mentioned previously.

Resistor 100 and capacitor 100 form the integrator time constant. Resistor 200 is normally included in order to limit the DC gain thereby preventing output offsets.

Figure 11:
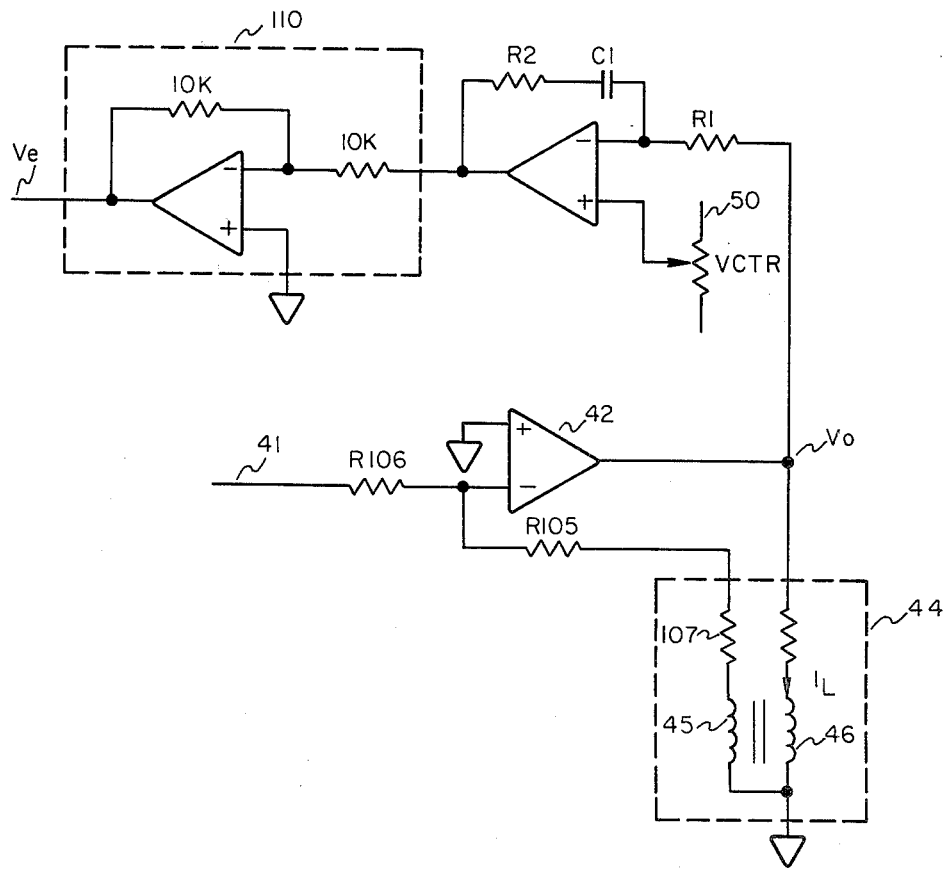
FIG. 11 is a schematic diagram of an alternate deflection amplifier embodiment which has a gain greater than unity.

Referring to FIG. 11, a detailed schematic diagram of an alternate deflection amplifier embodiment which has a gain greater than unity.

The resistor R105 is selected to be of a sufficiently high value such that loading on the sense winding 45 is minimal and unity coupling is provided between the two yoke windings 45 and 46. The output amplifier 42 is connected in an inverting configuration with a gain of $$G = -\frac{R105 + R107}{R106} \simeq -\frac{R105}{R106}$$

where R107 is the series resistance of sense winding 45, thereby providing a gain other than unity.

Due to the inversion inherent in this scheme, an inverting amplifier 110 is required in the $V_E$ feedback loop to maintain proper feedback sense.

I claim:

1. Vertical deflection apparatus for a scanning system having a vertical deflection scanning rate and a horizontal scanning rate comprising:
    first means for producing a parabolic signal having a repetition rate at the horizontal deflection rate;
    second means for producing a ramp signal having a repetition rate at the vertical deflection rate;
    third means coupled to the first means and the second means for multiplying the parabolic signal and the ramp signal and producing the product as an output; and
    fourth means coupled to the third means for differentiating the third means output and producing a pin-cushion correction signal.

2. Apparatus as in claim 1 comprising:
    a vertical deflection amplifier having an output, a first input coupled to the fourth means output and a second input; and
    a vertical deflection yoke having a main winding coupled to the amplifier output and a sense winding coupled to the amplifier second input.

3. Apparatus as in claim 2 wherein the vertical deflection amplifier first input is capacitively coupled to the fourth means output.

4. Apparatus as in claim 2 comprising:
    compensation means having an output coupled to the vertical deflection amplifier first input and being coupled to receive the vertical deflection amplifier output and to receive a vertical centering reference voltage for comparing the vertical deflection amplifier output with the vertical centering reference voltage and producing an output corresponding to the comparison.

5. Apparatus as in claim 4 comprising switch means coupled to receive a retrace signal and to the compensation means for allowing the compensation means to produce its output only during vertical retrace in response to receiving the retrace signal.

6. Deflection apparatus for a display system having a first deflection scanning rate in a first direction and a second deflection scanning rate in a second direction comprising:
    first means for producing a parabolic signal having a repetition rate at the first deflection scanning rate;
    second means for producing a ramp signal having a repetition rate at the second deflection scanning rate;
    third means coupled to the first means and the second means for multiplying the parabolic signal and the ramp signal and producing the product as an output; and
    fourth means coupled to the third means for differentiating the third means output and producing a second direction deflection signal.

7. Apparatus as in claim 6 comprising:
    a deflection amplifier having an output, a first input coupled to the fourth means output and a second input; and
    deflection means having a main winding coupled to the amplifier output and a sense winding coupled to the amplifier second input.

8. Apparatus as in claim 7 wherein the amplifier first input is capacitively coupled to the fourth means output.

9. Apparatus as in claim 7 comprising:
compensation means having an output coupled to the amplifier first input and being coupled to receive the amplifier output and to receive a reference voltage for comparing the amplifier output with the reference voltage and producing an output corresponding to the comparison.

10. Apparatus as in claim 9 comprising switch means coupled to receive a sample signal and to the compensation means for allowing the compensation means to apply its output to the amplifier only in response to receiving the sample signal.

11. A method for producing a pin-cushion distortion corrected deflection signal for a raster scan display system having a first deflection scanning rate in a first direction and a second deflection scanning rate in a second direction comprising the steps of:
generating a parabolic signal having a repetition rate at the first deflection scanning rate;
generating a ramp signal having a repetition rate at the second deflection scanning rate;
multiplying the ramp signal and the parabolic signal to produce a product signal; and
differentiating the product signal to produce a correction signal.

* * * * *